US012735065B2

(12) United States Patent
Abe et al.

(10) Patent No.: US 12,735,065 B2
(45) Date of Patent: Sep. 15, 2026

(54) VEHICLE CONTROL SYSTEM, VEHICLE CONTROL METHOD, AND COMPUTER-READABLE MEDIUM

(71) Applicant: TOYOTA JIDOSHA KABUSHIKI KAISHA, Toyota (JP)

(72) Inventors: Sadayuki Abe, Sunto-gun Shizuoka-ken (JP); Yusuke Hayashi, Atsugi (JP); Daichi Hotta, Tokyo-to (JP); Taichi Kawanai, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/079,901

(22) Filed: Mar. 14, 2025

(65) Prior Publication Data

US 2025/0296598 A1 Sep. 25, 2025

(30) Foreign Application Priority Data

Mar. 19, 2024 (JP) ................................ 2024-043002

(51) Int. Cl.
*B60W 40/10* (2012.01)
*B60W 40/105* (2012.01)
*B60W 60/00* (2020.01)

(52) U.S. Cl.
CPC ........ *B60W 60/001* (2020.02); *B60W 40/105* (2013.01); *B60W 2520/10* (2013.01)

(58) Field of Classification Search
CPC ......... B60W 2520/10; B60W 2720/10; B60W 30/10; B60W 40/105; B60W 50/023; B60W 60/001; B60W 60/0011; B60W 60/00186
See application file for complete search history.

(56) References Cited

U.S. PATENT DOCUMENTS 11,548,503 B2 * 1/2023 Goto ................. B60W 60/0018
12,032,378 B2 * 7/2024 Mujica ................... G05B 15/02
12,179,795 B2 * 12/2024 Henke ................ B60W 60/0011
12,491,871 B1 * 12/2025 Zhang .................. B60W 30/09
2015/0224987 A1 * 8/2015 Tachibana ............ B60W 30/09 701/1
2019/0072973 A1 * 3/2019 Sun ................. B60W 60/00276
2019/0155293 A1 * 5/2019 Oniwa ............... B60W 50/082

(Continued)

FOREIGN PATENT DOCUMENTS

| | | |
|---|---|---|
| JP | 2019-171970 A | 10/2019 |
| JP | 2021-075186 A | 5/2021 |
| JP | 2021-127039 A | 9/2021 |

*Primary Examiner* — Tyler J Lee
(74) *Attorney, Agent, or Firm* — Dinsmore & Shohl LLP

(57) ABSTRACT

When an abnormality is detected in a generating function of a first target trajectory included in a calculation unit that generates the first target trajectory, failover processing is performed to switch a basic target trajectory used to generate a final target trajectory from the first target trajectory to a second target trajectory. In the failover processing, the first target trajectory generated before the detection of the abnormality of the generating function is updated based on an estimated movement amount of the vehicle during the failover processing. Then, a position where at least the target position of the second target trajectory generated after the detection of the abnormality and the target position of the first target trajectory after the update match is set as a switchover position of the basic target trajectory.

7 Claims, 7 Drawing Sheets

(56) References Cited

U.S. PATENT DOCUMENTS

2019/0302763 A1 10/2019 Kondo et al.
2020/0133277 A1* 4/2020 Hokai .................. G05D 1/0088
2021/0048817 A1* 2/2021 Olson ................... B60W 30/00
2021/0107478 A1* 4/2021 Goto ................... B60W 50/029
2021/0107513 A1* 4/2021 Goto ..................... B60W 30/09
2021/0107522 A1* 4/2021 Goto .................. B60W 60/0011
2021/0139050 A1 5/2021 Fujita et al.
2021/0253133 A1 8/2021 Miyamoto et al.
2021/0300409 A1* 9/2021 Matsunaga .......... G06V 20/588
2021/0300419 A1* 9/2021 Matsunaga ....... B60W 60/0018
2022/0066459 A1* 3/2022 Jain ...................... G05D 1/0088
2022/0177007 A1* 6/2022 Nemoto .............. B60W 60/007
2022/0188667 A1* 6/2022 Burisch .................. G08G 1/166
2024/0400095 A1* 12/2024 Lee .................... B60W 60/0011
2025/0002047 A1* 1/2025 Laurense ........... B60W 60/0011
2025/0042436 A1* 2/2025 Agrawal ............... B60W 30/09
2025/0171046 A1* 5/2025 Linscott .............. B60W 60/001

* cited by examiner

VEHICLE CONTROL SYSTEM, VEHICLE CONTROL METHOD, AND COMPUTER-READABLE MEDIUM

CROSS-REFERENCE TO RELATED APPLICATIONS

The present application claims priority under 35 U.S.C. § 119 to Japanese Patent Application No. 2024-043002, filed on Mar. 19, 2024, the contents of which application are incorporated herein by reference in their entirety.

TECHNICAL FIELD

The present disclosure relates to a system, a method, and a computer-readable medium for controlling a vehicle performing autonomous driving.

BACKGROUND

JP2019171970A discloses a system for driving control of a vehicle that performs autonomous driving. The system includes a primary system calculation unit and a redundant system calculation unit. The primary system calculation unit calculates a target trajectory in the driving control. When an abnormality occurs in the primary system calculation unit, the redundant system calculation unit calculates the target trajectory instead of the primary system calculation unit.

JP2021127039A discloses a system for autonomous driving of a vehicle. The system comprises a primary driving control portion and a redundant driving control portion. The primary driving control portion performs autonomous driving of the vehicle. When a functional degradation of the primary driving control portion is detected, the primary driving control portion sends a takeover instruction of autonomous driving to the redundant driving control portion. The redundant driving control portion performs the driving control of the vehicle based on the information included in the takeover instruction.

JP2021075186A discloses a system for driving control of a vehicle that performs autonomous driving. The system comprises a plurality of computing devices. Each of the plurality of computing devices separately generates target trajectories of the vehicle in the driving control. When a defect occurs in any of the plurality of computing devices, this system performs the driving control based on the target trajectory generated by the computing device other than the computing device related to the defect.

The system described in JP2021075186A is classified into a hot standby system in which a primary system calculation unit and a redundant system calculation unit are always operated. In contrast, the systems described in JP2019171970A and JP2021127039A are classified as warm standby systems in which the redundant system calculation unit is placed in a standby state while the primary system calculation unit is operated.

In the hot standby system, a defect caused by a shortage of resources such as a CPU and a memory may occur simultaneously in the primary and redundant systems. In the hot standby system, since the target trajectories are separately generated in the primary and redundant systems, there is also a problem that the target trajectories are not completely the same. Therefore, if the switching from the primary system to the redundant system is performed instantaneously, rapid acceleration or rapid deceleration of the vehicle may occur, or sudden steering of the vehicle may occur.

In this respect, in the warm standby system, the redundant system can be made to wait with the minimum resource allocated to the redundant system. By providing the takeover information from the primary system to the redundant system at the time of switching from the primary system to the redundant system, the behavior of the vehicle at the switching can be stabilized. However, the warm standby system has a problem that it takes a longer time to switch from the primary system to the redundant system than the hot standby system. Therefore, a deviation occurs between the state of the vehicle at the takeover and the current state, and the behavior of the vehicle may not be stabilized.

An object of the present disclosure is to provide a technique for suppressing unstable behavior of a vehicle when switching from a primary system to a redundant system when driving control of the vehicle is performed using the primary and redundant system calculation units.

SUMMARY

A first aspect of the present disclosure is a system for controlling a vehicle that performs autonomous driving and has the following features.

The system includes first and second calculation units, a management unit, and a control unit.

The first calculation unit is configured to generate a first target trajectory in the autonomous driving. The second calculation unit is configured to generate a second target trajectory in the autonomous driving. The management unit is configured to manage the first and second calculation units. The management unit is configured to generate a final target trajectory in the autonomous driving. The control unit is configured to perform autonomous driving control of the vehicle based on the final target trajectory.

The first, second and final target trajectories are composed of a set of a target position and target speed of the vehicle, respectively.

The management unit is configured to: generate the final target trajectory using the first target trajectory when a generating function of the first target trajectory in the first calculation unit is normal; and perform failover processing of switching a basic target trajectory used for generating the final target trajectory from the first target trajectory to the second target trajectory when an abnormality of the generating function is detected.

The management unit is configured to: estimate a movement amount of the vehicle during the failover processing based on status information of the vehicle before the detection of the abnormality and final information of the first target trajectory generated before the detection of the abnormality; calculate an updated target position and an updated target speed of the vehicle by updating the first target trajectory constituting the final information based on the estimated movement amount of the vehicle; compare a first set indicating a set of the updated target position and the updated target speed with a second set indicating a set of the target position and the target speed constituting the second target trajectory generated after the detection of the abnormality; and set a position where at least information of the target position matches in the first and second sets as a switchover position of the basic target trajectory.

A second aspect of the present disclosure is a method for controlling a vehicle for autonomous driving and has the following features.

The method includes: generating a first target trajectory in the autonomous driving; generating a second target trajectory in the autonomous driving; generating a final target trajectory in the autonomous driving; and performing autonomous driving control of the vehicle based on the final target trajectory.

The first, second and final target trajectories are composed of a set of a target position and target speed of the vehicle, respectively.

When a generating function of the first target trajectory included in a calculation unit that generates the first target trajectory is normal, the final target trajectory is generated using the first target trajectory.

When an abnormality of the generating function is detected, failover processing is performed to switch a basic target trajectory used to generate the final target trajectory from the first target trajectory to the second target trajectory.

The failover processing includes: estimating the movement amount of the vehicle during the failover processing based on the status information of the vehicle before the detection of the abnormality and final information of the first target trajectory generated before the detection of the abnormality; calculating an updated target position and an updated target speed of the vehicle by updating the first target trajectory constituting the final information based on the estimated movement amount of the vehicle; comparing a first set indicating a set of the updated target position and the updated target speed with a second set indicating a set of the target position and the target speed constituting the second target trajectory generated after the detection of the abnormality; and setting a position where at least information of the target position matches in the first and second sets as a switchover position of the basic target trajectory.

A third aspect of the present disclosure is a non-transitory computer-readable medium storing a program to control a vehicle in which autonomous driving is performed and has the following features.

The program is configured to cause a computer to execute: generating a first target trajectory in the autonomous driving; generating a second target trajectory in the autonomous driving; generating a final target trajectory in the autonomous driving; and performing autonomous driving control of the vehicle based on the final target trajectory.

The first, second and final target trajectories are composed of a set of a target position and target speed of the vehicle, respectively.

When a generating function of the first target trajectory included in a calculation unit that generates the first target trajectory is normal, the final target trajectory is generated using the first target trajectory.

When an abnormality of the generating function is detected, failover processing is performed to switch the basic target trajectory used to generate the final target trajectory from the first target trajectory to the second target trajectory.

The failover processing includes: estimating the movement amount of the vehicle during the failover processing based on the status information of the vehicle before the detection of the abnormality and final information of the first target trajectory generated before the detection of the abnormality; calculating an updated target position and an updated target speed of the vehicle by updating the first target trajectory constituting the final information based on the estimated movement amount of the vehicle; comparing a first set indicating a set of the updated target position and the updated target speed with a second set indicating a set of the target position and the target speed constituting the second target trajectory generated after the detection of the abnormality; and setting a position where at least information of the target position matches in the first and second sets as a switchover position of the basic target trajectory.

According to the present disclosure, when the abnormality is detected in the generating function of the first target trajectory included in a calculation unit that generates the first target trajectory, failover processing is performed to switch the basic target trajectory used for generating the final target trajectory from the first target trajectory to the second target trajectory. In the failover processing, the first target trajectory generated before the detection of the abnormality of the generating function is updated based on the estimated movement amount of the vehicle during the failover processing. Then, the position where at least the target position of the second target trajectory generated after the detection of the abnormality and the target position of the first target trajectory after the update match is set as the switchover position of the basic target trajectory. Therefore, according to the present disclosure, it is possible to suppress the occurrence of rapid acceleration or rapid deceleration of the vehicle or the occurrence of sudden steering of the vehicle after the failover processing is completed.

DESCRIPTION OF EMBODIMENT

Hereinafter, an embodiment of the present disclosure will be described with reference to the drawings.

1. Outline

Figure 1:
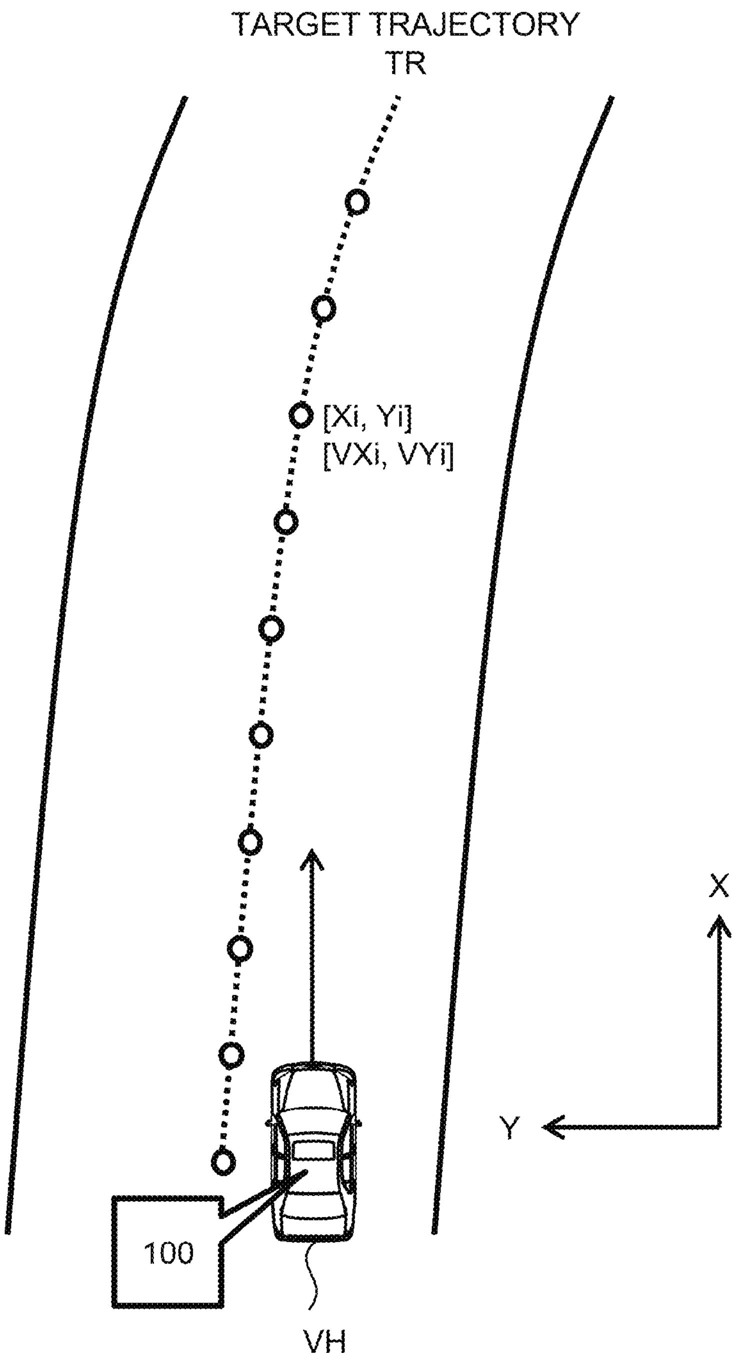
FIG. 1 is a conceptual diagram illustrating an outline of an embodiment of the present disclosure.

FIG. 1 is a conceptual diagram for illustrating an outline of a system according to the embodiment. A system 100 shown in FIG. 1 is a system for controlling a vehicle VH. Typically, the system 100 is mounted on a vehicle VH. Some of the functions of the system 100 may be included in an external equipment of the vehicle VH, or the control of the vehicle VH may be performed by the external equipment. That is, the functions of the system 100 may be distributed to the vehicle VH and the external equipment.

The vehicle VH is a vehicle that performs autonomous driving. The autonomous driving here is based on the premise that an operator (e.g., a driver) of the vehicle VH does not necessarily need to concentrate on 100% driving. As the autonomous driving, what is called a level 3 or higher is assumed.

The autonomous driving of the vehicle VH is realized by the system 100. The system 100 controls steering, acceleration, and deceleration of the vehicle VH as vehicle control for autonomous driving (hereinafter also referred to as "autonomous driving control"). In the autonomous driving control, the driving devices (steering device, driving device, and braking device) of the vehicle VH are controlled such that the vehicle VH follows a target trajectory TR.

The target trajectory TR includes a set of target positions [Xi, Yi] of the vehicle VH in a lane in which the vehicle VH travels, and target speeds [VXi, VYi] for the respective target positions [Xi, Yi]. In the example shown in FIG. 1, the X direction is a forward direction of the vehicle VH, and the Y direction is a planar direction orthogonal to the X direction. The coordinate system (X, Y) is not limited to the example shown in FIG. 1.

In order to cause the vehicle VH to follow the target trajectory TR, in the autonomous driving control, a deviation (e.g., a lateral deviation, a yaw angle deviation, and a speed deviation) between the vehicle VH and the target trajectory TR is calculated. Then, the driving device of the vehicle VH is controlled such that the deviation decreases.

In the embodiment, a case where the target trajectory TR is generated by the warm standby system is considered. In this case, the generation of the target trajectory TR is performed by a primary system calculation unit. When an abnormality is detected in the primary system calculation unit, a redundant system calculation unit starts generating the target trajectory TR. The autonomous driving control is performed based on the target trajectory TR generated by the primary or redundant system calculation unit.

Hereinafter, the primary system calculation unit is also referred to as a "first calculation unit", and the redundant system calculation unit is also referred to as a "second calculation unit". The target trajectory TR used for the autonomous driving control is also referred to as a "final target trajectory TRF". The target trajectory TR generated by the first calculation unit is referred to as a "first target trajectory TR1", and the target trajectory TR generated by the second calculation unit is referred to as a "second target trajectory TR2".

Each of the first target trajectory TR1, the second target trajectory TR2, and the final target trajectory TRF includes a set of target positions [Xi, Yi] and a set of target speeds [VXi, VYi] for the respective target positions [Xi, Yi]. In the following description, the target position and the target speed included in the first target trajectory TR1 are represented by [X1*i*, Y1*i*] and [VX1*i*, VY1*i*], respectively. The target position and the target speed included in the second target trajectory TR2 are represented by [X2*i*, Y2*i*] and [VX2*i*, VY2*i*], respectively.

Information of the target position [Xi, Yi] and the target speed [VXi, VYi] included in the final target trajectory TRF generated by using the first target trajectory TR1 matches information of the target position [X1*i*, Y1*i*] and the target speed [VX1*i*, VY1*i*]. Information of the target position [Xi, Yi] and the target speed [VXi, VYi] included in the final target trajectory TRF generated by using the second target trajectory TR2 matches information of the target position [X2*i*, Y2*i*] and the target speed [VX2*i*, VY2*i*].

Figure 2:
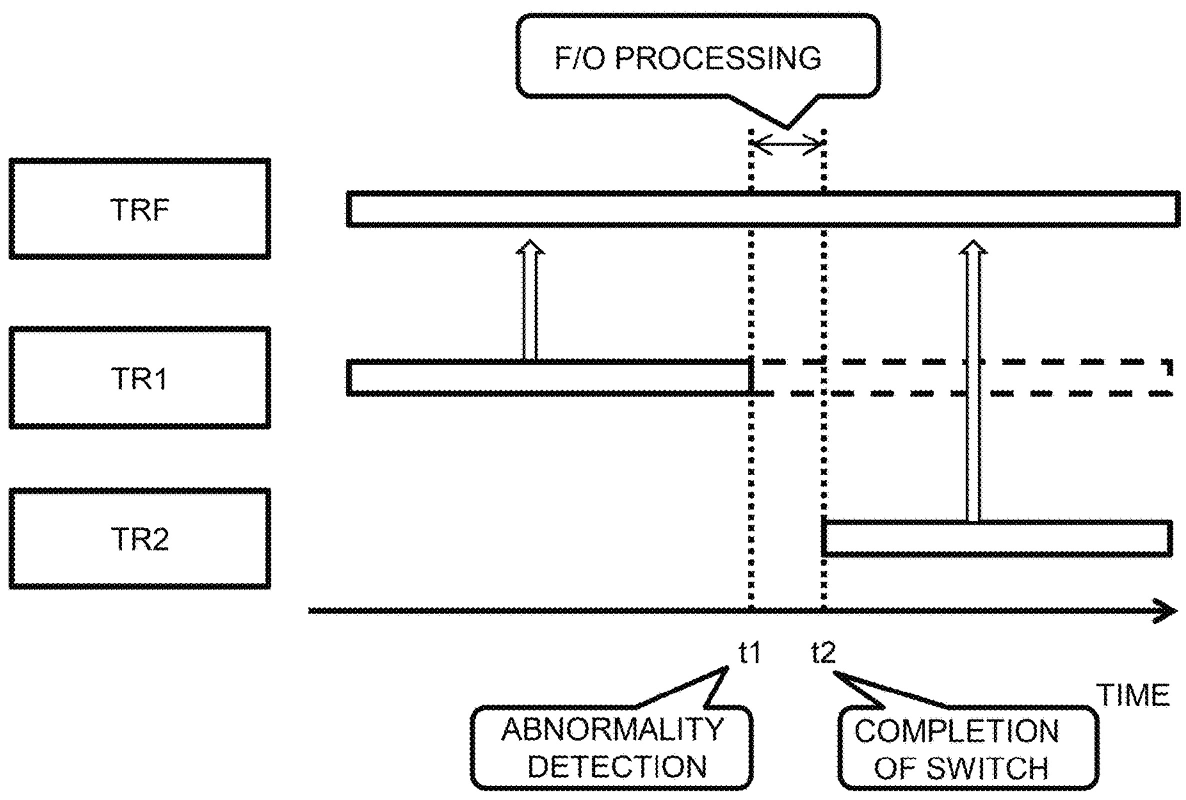
FIG. 2 is a diagram illustrating a viewpoint of the embodiment.

FIG. 2 is a diagram illustrating a viewpoint of the embodiment. FIG. 2 is also a diagram for illustrating a relationship between the final target trajectory TRF, the first target trajectory TR1 and the second target trajectory TR2. The time t1 shown in FIG. 2 is a time at which an abnormality is detected in the generating function of the first target trajectory TR1 in the first calculation unit. The abnormality of the generating function includes exhaustion of resources such as a CPU and a memory, and a processing delay of an OS. Therefore, depending on a mode of the abnormality, the first target trajectory TR1 may be generated in the first calculation unit even after the time t1.

The generation of the second target trajectory TR2 starts from the time t1. Failover processing (hereinafter also referred to as "F/O processing") is also started from the time t1. The F/O processing is processing to switch a target trajectory TR (hereinafter, also referred to as a "basic target trajectory TRB") used for generation of the final target trajectory TRF from the first target trajectory TR1 to the second target trajectory TR2. In the example shown in FIG. 2, the F/O processing is completed at the time t2. That is, the F/O processing is performed from the time t1 to the time t2. An interval from the time t1 to the time t2 depends on a system configuration, and a fixed time is assumed in the embodiment.

Here, before the F/O processing is started, that is, before the time t1, the final target trajectory TRF is generated by using the first target trajectory TR1. After the F/O processing is completed, that is, after the time t2, the final target trajectory TRF is generated by using the second target trajectory TR2.

During the F/O processing, that is, from the time t1 to the time t2, the final target trajectory TRF is not generated. As described above, the second target trajectory TR2 is generated after the time t2. An initial generation of the second target trajectory TR2 is generated by using final information of the first target trajectory TR1 generated at the time before the time t1 (e.g., the time t3). This initial generation itself is performed before the time t2. However, during the F/O processing, the generation of the final target trajectory TRF using the initial second target trajectory TR2 is not performed. The time t3 is a time on or earlier than the time t1.

The autonomous driving control during the F/O processing is performed based on the final target trajectory TRF generated by using the final information of the first target trajectory TR1. The problem here is that the vehicle VH is moving during the F/O processing. Therefore, even if it is assumed that the F/O processing is completed in the minimum time, there is a possibility that the information of the second target trajectory used for the generation of the final target trajectory TRF performed in association with the completion of the F/O processing deviates from the information reflecting the state of the vehicle VH during the F/O processing. In particular, in the warm standby system, the F/O processing may take time, and this deviation increases. Further, when the vehicle speed or the steering angle of the vehicle VH is large, the deviation becomes large.

Figure 3:
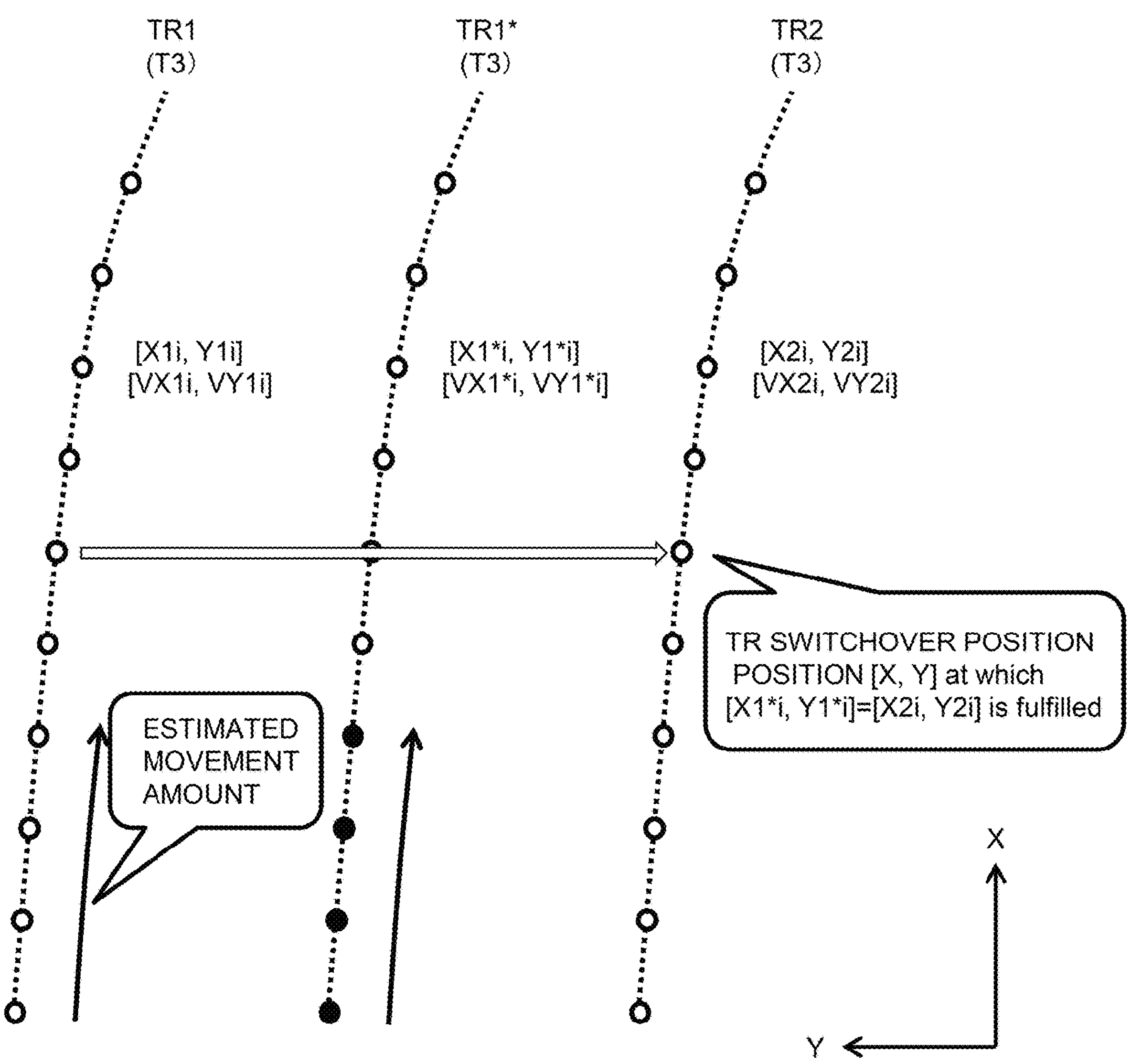
FIG. 3 is a diagram for illustrating processing performed in failover processing of the embodiment.

Therefore, in the embodiment, the following processing is performed in the F/O processing. FIG. 3 is a diagram for illustrating processing performed in the F/O processing of the embodiment. In the leftward of FIG. 3, the first target trajectory TR1 (T3) generated in the time t3 is drawn. In the rightward of FIG. 3, the second target trajectory TR2 (T3) generated based on the final information of the first target trajectory TR1 generated in the time t3 is also drawn. The information of the target position [X1*i*, Y1*i*] and the target speed [VX1*i*, VY1*i*] included in the first target trajectory TR1 (T3) matches the information of target position [X2*i*, Y2*i*] and target speed [VX2*i*, VY2*i*] included in the second target trajectory TR2 (T3).

In the F/O processing, a movement amount (each movement amount in the X and Y directions) of the vehicle VH during the F/O processing is estimated based on a history of status information (e.g., vehicle speed, accelerations, and steering angles) of the vehicle VH before the time t1. This estimation is performed based on an assumption that the vehicle VH moves in accordance with the final target trajectory TRF generated using the first target trajectory TR1 (T3) during the F/O processing. When the estimated movement amount of the vehicle VH is calculated, target positions [X1i, Y1i] where the vehicle VH will reach or pass through during the F/O processing are specified.

In the F/O processing, the first target trajectory TR1 (T3) is updated (corrected) using the specified target positions [X1i, Y1i]. The first target trajectory TR1 (T3) is updated by, for example, deleting information of the specified target positions [X1i, Y1i] from the information of the first target trajectory TR1 (T3). The first target trajectory TR1*(T3) drawn in the center of FIG. 3 represents the first target trajectory TR1 (T3) after the update. The target position and the target speed (the updated target position and the updated target speed) included in the first target trajectory TR1*(T3) are represented by [X1*i, Y1*i] and [VX1*i, VY1*i].

In the F/O processing, a set of the target positions [X1*i, Y1*i] and the target speeds [VX1*i, VY1*i] is further compared with the set of the target positions [X2i, Y2i] and the target speeds [VX2i, VY2i]. Then, the position [X, Y] at which at least the information of the target position matches is set as a switchover position from the first target trajectory TR1 to the second target trajectory TR2.

The matching of the information of the target position mentioned here includes not only the case where the target position [X1*i, Y1*i] and the target position [X2i, Y2i] completely match, but also the case where there is an error (several %) that can be regarded as complete matching. Further, the fact that at least the information of the target position matches means that both the information of the target position and the information of the target speed may match.

By setting such a switchover position, it is possible to reduce a difference between the target position [X1i, Y1i] before the switchover of the basic target trajectory TRB and the target position [X2i, Y2i] after the switchover to be equal to or less than an error that can be regarded as a perfect match. Therefore, it is possible to suppress an occurrence of rapid acceleration or rapid deceleration of the vehicle VH or an occurrence of sudden steering of the vehicle VH after the completion of the F/O processing. A configuration example of the system for realizing such a function will be described below.

2. Configuration Example

Figure 4:
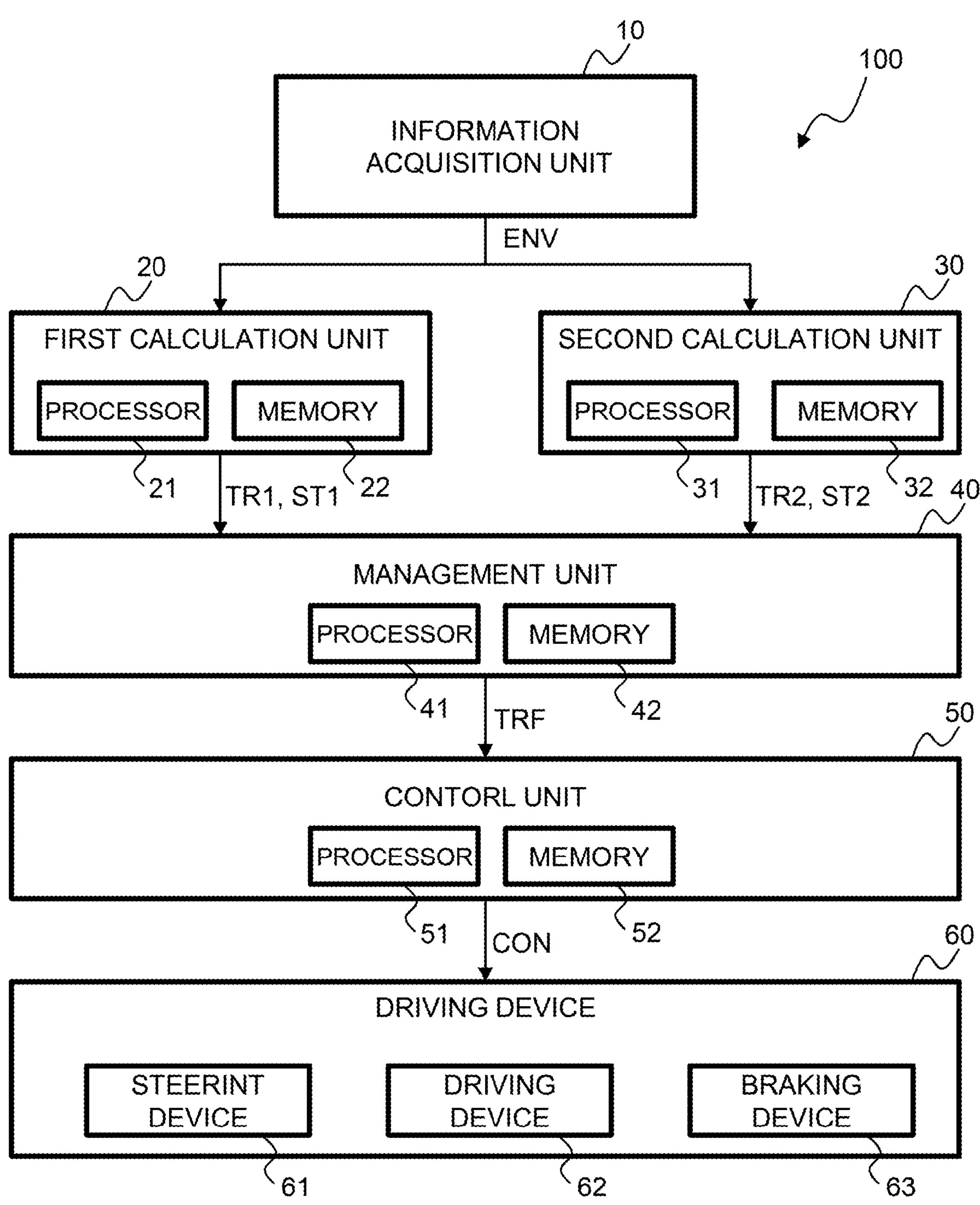
FIG. 4 is a block diagram illustrating an example of a configuration of a system according to the embodiment.

FIG. 4 is a block diagram illustrating an example configuration of the system 100 according to the embodiment. The system 100 includes an information acquisition unit 10, a first calculation unit 20, a second calculation unit 30, a management unit 40, a control unit 50, and a driving unit 60. These units are connected to each other via, for example, an in-vehicle network (e.g., a control unit area network (CAN)).

The information acquisition unit 10 acquires driving environment information ENV. The driving environment information ENV is information indicating driving environment of the vehicle VH and is information necessary for the autonomous driving of the vehicle VH. Examples of the driving environment information ENV include map information, positional information, status information, peripheral information, and distribution information.

The map information includes, for example, information on the position of a road and a road shape. The map information is acquired from a map database or an external server mounted on the vehicle. The positional information is information indicating a position and a direction of the vehicle VH. The positional information is acquired from, for example, a global positioning system (GPS) equipment. The status information is information indicating a status of the vehicle VH. The status information is acquired from a state sensor such as a vehicle speed sensor, a yaw rate sensor, an acceleration sensor, or a steering angle sensor.

The surrounding information is information indicating a situation around the vehicle VH. The surrounding information is acquired from a recognition sensor such as a camera, a LIDAR (laser imaging detection and ranging), or a radar. The surrounding information includes information on an object (e.g., a vehicle, a walker, a roadside object, an obstacle, a white lane, and the like) around the vehicle VH. The surrounding information also includes information of relative information (position and speed) of the object with respect to the vehicle VH. The distribution information is acquired from an external equipment. The distribution information is provided from the infrastructure around the vehicle VH and some vehicles around the vehicle VH.

The first calculation unit 20 is a calculation unit that performs various kinds of information processing. For example, the first calculation unit 20 is a microcomputer. The first calculation unit 20 is also referred to as an ECU (electronic control unit). More specifically, the first calculation unit 20 includes at least one processor 21 and at least one memory device 22.

The memory device 22 stores various information. For example, the memory device 22 stores the driving environment information ENV acquired by the information acquisition device 10. Examples of the memory device 22 include a volatile memory, a nonvolatile memory, and a HDD (hard disk drive). The processor 21 executes a computer program. The computer program is stored in the memory device 22 or recorded in a computer-readable recording medium. The processor 21 executes the computer program, thereby realizing the function of the first calculation unit 20.

The function of the first calculation unit 20 includes a generating function of the first target trajectory TR1. The first target trajectory TR1 is generated based on the driving environment information ENV. For example, the first calculation unit 20 may generate the first target trajectory TR1 for driving while maintaining the current traveling lane. As another example, the first calculation unit 20 generates the first target trajectory TR1 for a lane change. As another example, the first calculation unit 20 generates the first target trajectory TR1 for avoiding a collision between the vehicle VH and a surrounding object.

The first calculation unit 20 (the processor 21) outputs the first target trajectory TRI to the management unit 40. The first calculation unit 20 outputs the latest first target trajectory TR1 to the management unit 40 every time the first target trajectory TR1 is generated.

The second calculation unit 30 is a calculation unit that performs various kinds of information processing. The basic configuration of the second calculation unit 30 is the same as that of the first calculation unit 20. That is, the second calculation unit 30 includes at least one processor 31 and at least one memory device 32.

The memory device 32 stores various information. For example, the memory device 32 stores the driving environment information ENV. The processor 31 executes a computer program. The computer program is stored in the memory device 32 or recorded in a computer-readable recording medium. The processor 31 executes the computer program, thereby realizing the function of the second calculation unit 30.

The function of the second calculation unit 30 includes a generating function of the second target trajectory TR2. The second target trajectory TR2 is generated based on the driving environment information ENV. An example of the second target trajectory TR2 is the same as that described in the first target trajectory TR1. When the F/O processing is performed, an initial generation of the second target trajectory TR is performed based on the final information of the first target trajectory TR1. In addition, when feedback information (hereinafter, also referred to as "F/B information") to be described later is received, the latest second target trajectory TR2 is updated based on the F/B information.

The second calculation unit 30 (the processor 31) outputs the second target trajectory TR2 to the management unit 40. The second calculation unit 30 outputs the latest second target trajectory TR2 to the management unit 40 every time the second target trajectory TR2 is generated. When the latest second target trajectory TR2 is updated based on the F/B information, the second calculation unit 30 outputs the updated second target trajectory TR2 to the management unit 40 as the latest second target trajectory TR2.

The management unit 40 is a calculation unit that performs various types of information processing. The basic configuration of the management unit 40 is the same as that of the first calculation unit 20. That is, the management unit 40 includes at least one processor 41 and at least one memory device 42.

The memory device 42 stores various information. For example, in addition to the driving environment information ENV, operating state information ST1, operating state information ST2, and the like are stored in the memory device 42. The operating state information ST1 is information indicating an operating state of the first calculation unit 20. The operating state information ST2 is information indicating an operating state of the second calculation unit 30. The operation state includes a CPU usage rate, a memory usage amount, a network load, and the like. The management unit 40 manages the first calculation unit 20 based on the operating state information ST1 and also manages the second calculation unit 30 based on the operating state information ST2.

The various information stored in the memory device 42 includes the first target trajectory TR1 and the second target trajectory TR2. The processor 41 executes a computer program. The computer program is stored in the memory device 42 or recorded in a computer-readable recording medium. The processor 41 executes the computer program, thereby realizing the function of the management unit 40.

The functions of the management unit 40 include a generating function of the final target trajectory TRF. The target trajectory used to generate the final target trajectory TRF is the first target trajectory TR1 while the function of the first calculation unit 20 (particularly, the generating function of the first target trajectory TR1) is normal. When an abnormality is detected in the function of the first calculation unit 20, the second target trajectory TR2 is used to generate the final target trajectory TRF.

The management unit 40 outputs the final target trajectory TRF to the control unit 50. The management unit 40 outputs the latest final target trajectory TRF to the control unit 50 every time the final target trajectory TRF is generated.

The management unit 40 (the processor 41) performs F/O processing when the abnormality is detected in the function of the first calculation unit 20. The F/O processing may be performed after confirming that the function of the second calculation unit 30 is normal. The management unit 40 may perform additional F/O processing when the abnormality is detected in the function of the second calculation unit 30. The additional F/O processing is processing for switching the target trajectory TR for generating the final target trajectory TRF from the second target trajectory TR2 to another target trajectory TR. Examples of another target trajectory TR include the first target trajectory TR1 when the function of the first calculation unit 20 is recovered.

In the F/O processing, when the abnormality is detected in the function of the first calculation unit 20, the management unit 40 calculates the estimated movement amount of the vehicle VH during the F/O processing based on the history of the status information of the vehicle VH before the time at which the abnormality is detected (i.e., the time t1 shown in FIG. 3). The management unit 40 also generates the first target trajectory TR1 (T3) based on the final information of the first target trajectory TRI generated at a time before the time t3 (i.e. the time t1). Then, the management unit 40 specifies a target position [X1*i*, Y1*i*] at which the vehicle VH will reach or pass during the F/O processing based on the estimated movement amount of the vehicle VH and the first target trajectory TR1 (T3).

In the F/O processing, the management unit 40 further updates (corrects) the first target trajectory TR1 (T3) by using the specified target position [X1*i*, Y1*i*]. Then, the management unit 40 compares the updated first target trajectory TR1 (T3) (i.e., the first target trajectory TR1*(T3) described in FIG. 3) with the second target trajectory TR2. The second target trajectory TR2 to be compared is generated based on the final information of the first target trajectory TR1 generated in the time t3 and transmitted from the second calculation unit 30 to the management unit 40.

The management unit 40 specifies a position [X, Y] where at least information of the target position matches in comparison between the first target trajectory TR1 (T3) after the update and the second target trajectory TR2. When the vehicle VH reaches the specified position [X, Y], the management unit 40 ends the F/O processing. The management unit 40 transmits information of the updated first target trajectory TR1 (T3) to the second calculation unit 30 as the F/B information in parallel with the comparison between the updated first target trajectory TR1 (T3) and the second target trajectory TR2.

The basic processing when the management unit 40 performs the additional F/O processing is the same as the above-described F/O processing. The additional F/O processing is described by replacing the "first target trajectory TR1" with the "second target trajectory TR2", replacing the "first target trajectory TR1 (T3)" with the "second target trajectory TR2 (T3)", and replacing the "second target trajectory TR2" with the "other target trajectory" in the description of the F/O processing described above.

The control unit 50 is a calculation unit that performs various types of information processing. The basic configuration of the control unit 50 is the same as that of the first calculation unit 20. That is, the control unit 50 includes at least one processor 51 and at least one memory device 52.

The memory device 52 stores various information. For example, the memory device 52 stores the final target trajectory TRF. The processor 51 executes a computer program. The computer program is stored in the memory device 52 or recorded in a computer-readable recording medium. The processor 51 executes the computer program, thereby realizing the function of the control unit 50.

The functions of the control unit 50 include an autonomous driving control function. The control unit 50 performs the autonomous driving control by controlling an operation of the driving unit 60. Specifically, the control unit 50 controls the steering (turning) of the vehicle VH by controlling the operation of a steering device 61. The control unit 50 controls the operation of a driving device 62 to control the acceleration of the vehicle VH. The control unit 50 controls the operation of a braking device 63 to control the deceleration of the vehicle VH.

In particular, the control unit 50 performs the autonomous driving control such that the vehicle VH follows the final target trajectory TRF. In this case, the control unit 50 calculates a deviation between the vehicle VH and the final target trajectory TRF based on the final target trajectory TRF, the positional information of the vehicle VH, and the status information. The deviation includes a lateral deviation (a Y direction deviation), a yaw angle deviation (an azimuth angle deviation), and a speed deviation. The control unit 50 may perform the autonomous driving control to reduce a deviation between the vehicle VH and the final target trajectory TRF.

The control unit 50 calculates a control amount for controlling the driving unit 60, that is, a control amount for at least one of steering, acceleration, and deceleration. The control amount required for the vehicle VH to follow the final target trajectory TRF, that is, the control amount required to reduce the deviation between the vehicle VH and the final target trajectory TRF, is hereinafter referred to as a "required control amount CON". Examples of the required control amount CON include a target steering angle, a target yaw rate, a target speed, a target acceleration, a target deceleration, a target torque, and a target current. The control unit 50 controls the operation of the driving unit 60 in accordance with the required control amount CON. That is, the control unit 50 controls at least one of steering, acceleration, and deceleration.

The driving unit 60 includes the steering device 61, the driving device 62, and the braking device 63. The steering device 61 steers wheels of the vehicle VH. For example, the steering device 61 includes an EPS (electric power steering) equipment. The driving device 62 is a power source that generates a driving force. Examples of the driving device 62 include an engine, an electric motor, and an in-wheel motor. The braking device 63 generates a braking force.

3. Examples of Information Processing

Figure 5:
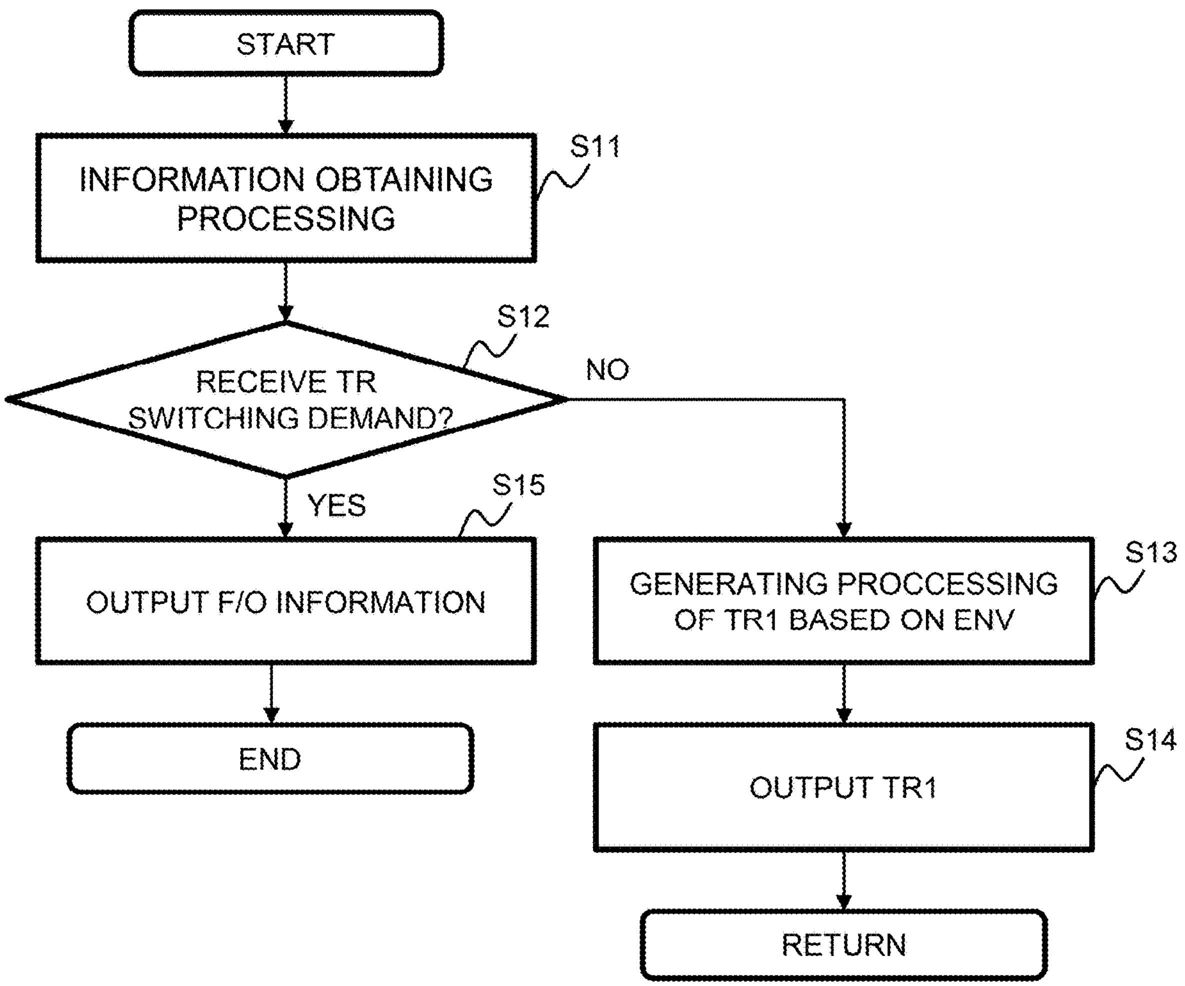
FIG. 5 is a flowchart showing a flow of information processing particularly related to the embodiment.
Figure 6:
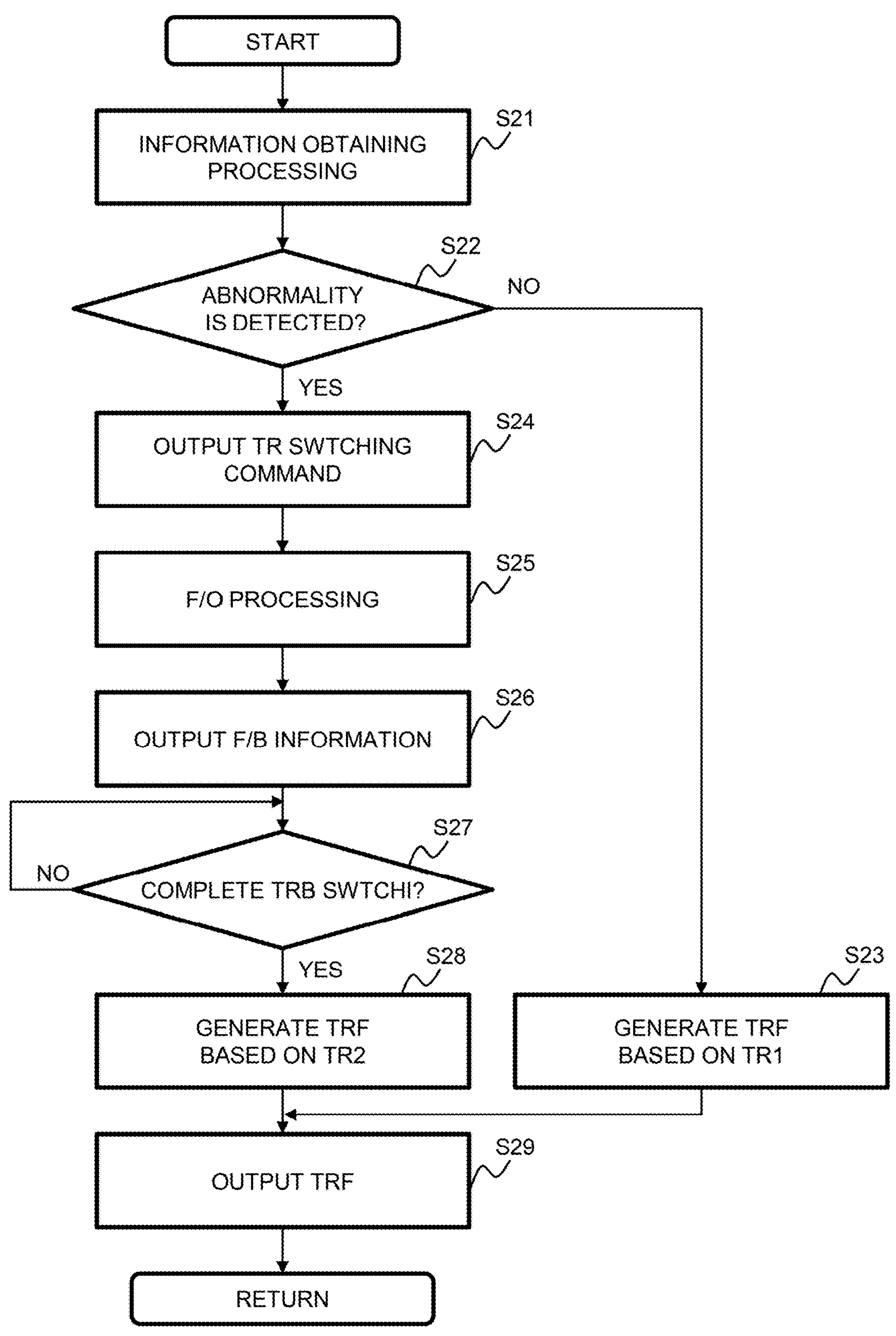
FIG. 6 is a flowchart showing a flow of information processing particularly related to the embodiment.
Figure 7:
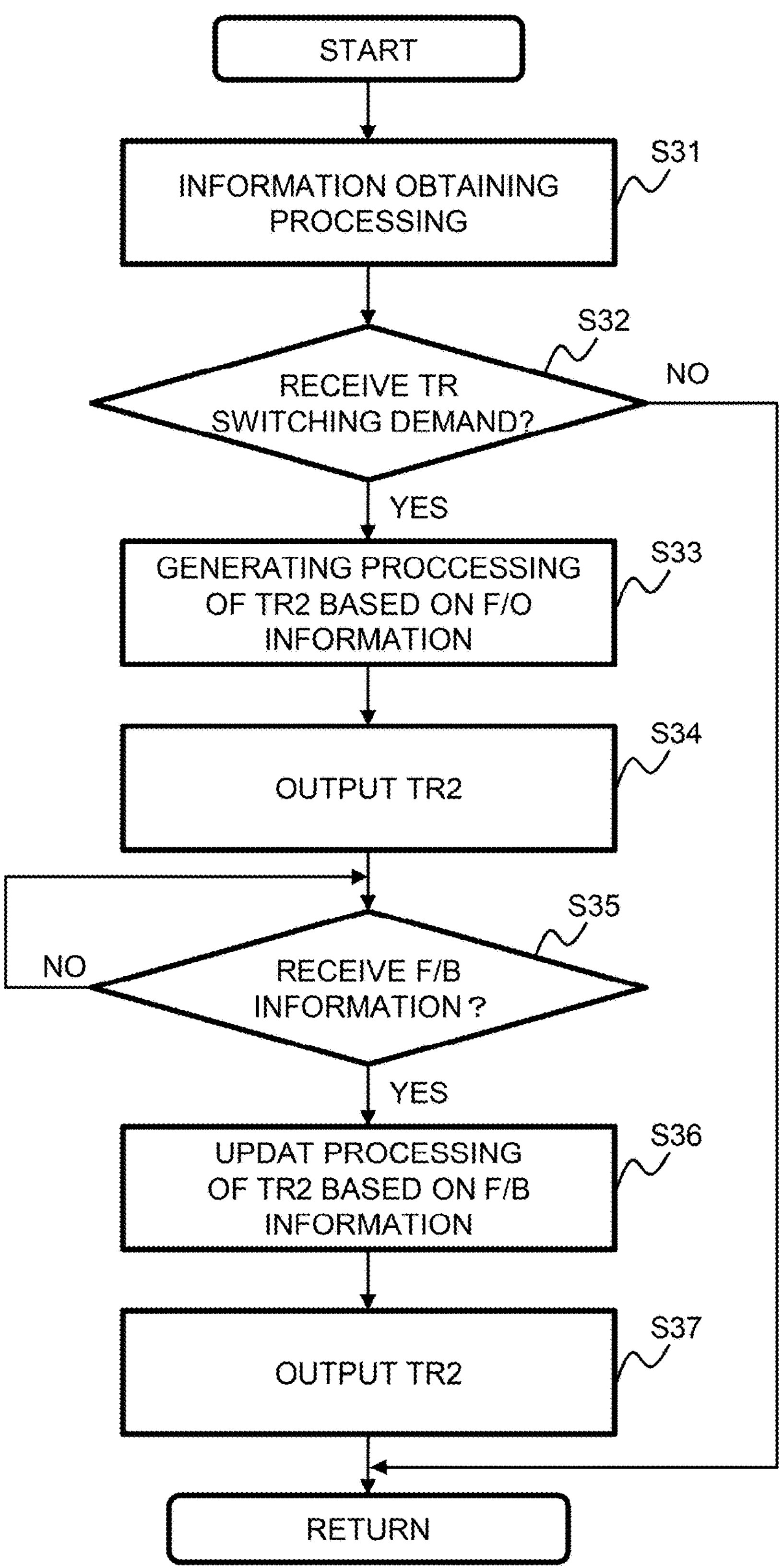
FIG. 7 is a flowchart showing a flow of information processing particularly related to the embodiment.

FIGS. 5-7 are flowcharts showing flows of processing particularly relevant to the embodiment. FIG. 5 relates to processing executed by the first calculation unit 20 (the processor 21). FIG. 6 relates to processing executed by the management unit 40 (the processor 41). FIG. 7 relates to processing executed by the second calculation unit 30 (the processor 31). The flowcharts shown in FIGS. 5 to 7 are repeatedly executed at every constant cycle.

In the routine shown in FIG. 5, first, information obtaining processing is performed (step S11). In the information acquisition process, for example, driving environment information ENV is acquired. In the information obtaining process, the operating state information ST1 is also obtained. In the information acquisition processing, external information is further acquired. The external information mentioned here is exemplified by input information from arithmetic equipment other than the first calculation unit 20, for example, input information from the second calculation unit 30 and the management unit 40.

Following the processing of step S11, it is determined whether a command to switch the basic target trajectory TRB (hereinafter, also referred to as a "TR switching command") has been received (step S12). The TR switching command corresponds to information input from the management unit 40 to the first calculation unit 20 among the above-described external information. The TR switching command is output from the management unit 40 when it is determined that the F/O processing is started. That is, the case where the TR switching command is output means the case where an abnormality is detected in the function of the first calculation unit 20.

If the judgment result in step S12 is negative, the first target trajectory TR1 is generated based on the driving environment information ENV (step S13). An example of the first target trajectory TR1 generated based on the driving environment information ENV is as described above. Then, the generated first target trajectory TR1 is output (step S14). The destination of the first target trajectory TR1 is the management unit 40.

When the judgment result in step S12 is positive, that is, when the TR switching command is received, failover information (hereinafter, also referred to as "F/O information") is output (step S15). The F/O information includes information on the latest first target trajectory S12 at the time of the processing of step TR1. That is, the F/O information includes the final information of the first target trajectory S12 that has been already generated at the time of the processing of step TR1. The output destination of the F/O information is the second calculation unit 30 and the management unit 40.

In the routine shown in FIG. 6, first, information obtaining processing is performed (step S21). In the information acquisition process, for example, driving environment information ENV is acquired. In the information obtaining process, the operating state information ST1 and the operating state information ST2 are obtained. In the information acquisition processing, external information is further acquired. The external information mentioned here is exemplified by input information from arithmetic equipment other than the management unit 40, for example, input information from the first calculation unit 20, the second calculation unit 30, and the control unit 50.

Following the processing of step S21, it is determined whether an abnormality has been detected in the function of the first calculation unit 20 (step S22). The processing of step S22 is a process for determining whether to start the F/O processing. The process of step S22 is performed based on the operating state information S21 acquired in step ST1. If the judgment result in step S22 is negative, that is, if it is determined that no abnormality is detected in the function of the first calculation unit 20, the final target trajectory TRF is generated using the latest first target trajectory TR1 (step S23). When the final target trajectory TRF is generated, the final target trajectory TRF is output to the control unit 50 (step S29).

If the judgment result in step S22 is positive, the TR switching command is output (step S24). The output destination of the TR switching command is the first calculation unit 20 and the second calculation unit 30. The TR switching command to the first calculation unit 20 includes a command to stop the generation processing of the first target trajectory TR1 and a command to output the latest information of the first target trajectory TRI at the current time to the second calculation unit 30. The TR switching command to the second calculation unit 30 includes a command to start generation processing of the second target trajectory TR.

In another example of the processing in step S24, the TR switching command to the first calculation unit 20 may instruct only to stop the generation processing of the first target trajectory TR1. The TR switching command to the second calculation unit 30 in this case includes information of the latest first target trajectory TR1 held by the management unit 40 at the present time and an instruction to start the generation processing of the second target trajectory TR based on the latest information.

After the processing of step S24, the F/O processing is performed (step S25). The specific content of the F/O processing is as described above. During the F/O processing, the target positions [X1*i*, Y1*i*] where the vehicle VH will reach or pass through during the F/O processing are specified, and the first target trajectory TR1 (T3) is updated (corrected) by using the target positions [Xli, Y1*i*]. The updated first target trajectory TR1 (T3) is output as the F/B information (step S26). The output destination of the F/B information is the second calculation unit 30.

Following the processing of step S26, it is determined whether the switching of the basic target trajectory TRB has been completed (step S27). As described above, in the F/O process, the switchover position [X, Y] from the first target trajectory TR1 to the second target trajectory TR2 is set. When the vehicle VH reaches the switchover position [X, Y], the F/O processing is ended. The processing of step S27 is repeatedly executed until the vehicle VH reaches the switchover position [X, Y].

If the judgment result in step S27 is positive, the final target trajectory TRF is generated using the latest second target trajectory TR2 (step S28). When the final target trajectory TRF is generated, the final target trajectory TRF is output to the control unit 50 (step S29).

In the routine shown in FIG. 7, first, information obtaining processing is performed (step S31). In the information acquisition process, for example, driving environment information ENV is acquired. In the information obtaining process, the operating state information ST2 is also obtained. In the information acquisition processing, external information is further acquired. The external information mentioned here is exemplified by input information from arithmetic equipment other than the second calculation unit 30, for example, input information from the first calculation unit 20 and the management unit 40.

Following the processing of step S31, it is determined whether the TR switching command has been received (step S32). The TR switching command corresponds to information input from the management unit 40 to the second calculation unit 30 among the above-described external information. If the judgment result in step S32 is negative, the processing routine is ended. In this case, the second calculation unit 30 (the processor 31) waits for the generation of the second target trajectory TR2.

When the judgment result in step S32 is positive, a second target trajectory TR2 is generated based on the F/O information (step S33). The F/O information is input from the first calculation unit 20 immediately after the TR switching command, or is input from the management unit 40 simultaneously with the TR switching command. Then, the generated second target trajectory TR2 is output (step S34). The destination of the second target trajectory TR2 is the management unit 40.

Following the processing of step S34, it is determined whether the F/B information is received (step S35). As described above, the F/B information is generated in the management unit 40 during the F/O processing and output to the second calculation unit 30 (see step S26 of FIG. 6). The processing of step S35 is repeatedly executed until the second calculation unit 30 receives the F/B information.

If the judgment result in step S35 is positive, the latest second target trajectory TR2 is updated based on the F/B information (step S36). The F/B information is information of the first target trajectory TR1 (T3) (i.e., the first target trajectory TR1*(T3) described in FIG. 3) updated during the F/O processing. When the update based on the F/B information is performed, the latest information of the second target trajectory TR2 held by the second calculation unit 30 is replaced with the information of the first target trajectory TR1*(T3). Thus, the latest information of the second target trajectory TR2 held by the second calculation unit 30 can be matched with the information of the target trajectory grasped by the management unit 40.

Following the processing of step S36, the updated second target trajectory TR2 (i.e., the first target trajectory TR1* (T3)) is output (step S37). The destination of the second target trajectory TR2 is the management unit 40. The generation processing of the second target trajectory TR2 after the processing of step S37 will be described by the processing by the routine described in FIG. 5. This generation processing is described by replacing the "first calculation unit 20" with the "second calculation unit 30" and the "first target trajectory TR1" with the "second target trajectory TR2" in the description of FIG. 5.

4. Modified Example

In the embodiment, the warm-standby system is assumed. However, the present disclosure can also be applied to a system of a hot standby type. In the case of the hot standby system, the second calculation unit 30 always generates the second target trajectory TR2. Therefore, it is expected that the time required for the F/O processing is shorter than that of the warm standby system.

However, in the hot standby system, the latest second target trajectory TR2 at the time when the abnormality is detected in the first calculation unit 20 (the time t2 shown in FIG. 3) may not completely coincide with the latest first target trajectory TR1. Therefore, the latest first target trajectory TR1 (T3) is updated by performing the above-described F/O processing, and the updated first target trajectory TR1 (T3) (i.e., the first target trajectory TR1*(T3)) and the latest second target trajectory TR2 are compared.

Then, in these target trajectories, a position [X, Y] where at least the information of the target position matches is set as the switchover position. Thus, even when the latest second target trajectory TR2 and the latest first target trajectory TR1 do not completely match, it is possible to suppress the occurrence of rapid acceleration or rapid deceleration of the vehicle VH or the occurrence of sudden steering of the vehicle VH after the completion of the F/O processing.

What is claimed is:

1. A system for controlling a vehicle that performs autonomous driving, comprising:

a first calculation unit configured to generate a first target trajectory in the autonomous driving;

a second calculation unit configured to generate a second target trajectory in the autonomous driving;

a management unit configured to manage the first and second calculation units and to generate a final target trajectory in the autonomous driving; and a control unit configured to perform autonomous driving control of the vehicle based on the final target trajectory, wherein the first, second and final target trajectories are composed of a set of a target position and target speed of the vehicle, respectively, wherein the management unit is further configured to:

generate the final target trajectory using the first target trajectory when a generating function of the first target trajectory in the first calculation unit is normal; and perform failover processing of switching a basic target trajectory used for generating the final target trajectory from the first target trajectory to the second target trajectory when an abnormality of the generating function is detected, wherein the management unit is further configured to:

estimate a movement amount of the vehicle during the failover processing based on status information of the vehicle before the detection of the abnormality and final information of the first target trajectory generated before the detection of the abnormality;

calculate an updated target position and an updated target speed of the vehicle by updating the first target trajectory constituting the final information based on the estimated movement amount of the vehicle;

compare a first set indicating a set of the updated target position and the updated target speed with a second set indicating a set of the target position and the target speed constituting the second target trajectory generated after the detection of the abnormality; and set a position where at least information of the target position matches in the first and second sets as a switchover position of the basic target trajectory.

2. The system according to claim 1, wherein the management unit is configured to, in the failover processing, set a position where both pieces of information of target position and target speed coincide with each other in the first and second sets to the switchover position of the basic target trajectory.

3. The system according to claim 1, wherein the second calculation unit is configured to:

wait for generation of the second target trajectory when the generating function of the first target trajectory is normal;

start generation of the second target trajectory after the detection of abnormality; and perform an initial generation of the second target trajectory after the detection of abnormality based on the final information.

4. The system according to claim 1, wherein the management unit is configured to calculate an updated target position and an updated target speed of the vehicle only during the failover processing.

5. The system according to claim 1, wherein the management unit is configured to transmit information of an updated target position and an updated target speed calculated during the failover processing to the second calculation unit, and wherein, when receiving the information of the updated target position and the updated target speed calculated during the failover processing, the second calculation unit is configured to update the second target trajectory generated before the information of the updated target position and the updated target speed is received based on the received information of the updated target position and the updated target speed.

6. A method for controlling a vehicle for autonomous driving, the method comprising:

generating a first target trajectory in the autonomous driving;

generating a second target trajectory in the autonomous driving;

generating a final target trajectory in the autonomous driving; and performing autonomous driving control of the vehicle based on the final target trajectory, wherein the first, second and final target trajectories are composed of a set of a target position and target speed of the vehicle, respectively, wherein, when a generating function of the first target trajectory included in a calculation unit that generates the first target trajectory is normal, the final target trajectory is generated using the first target trajectory, wherein, when an abnormality of the generating function is detected, failover processing is performed to switch a basic target trajectory used to generate the final target trajectory from the first target trajectory to the second target trajectory, wherein the failover processing includes:

estimating the movement amount of the vehicle during the failover processing based on the status information of the vehicle before the detection of the abnormality and final information of the first target trajectory generated before the detection of the abnormality;

calculating an updated target position and an updated target speed of the vehicle by updating the first target trajectory constituting the final information based on the estimated movement amount of the vehicle;

comparing a first set indicating a set of the updated target position and the updated target speed with a second set indicating a set of the target position and the target speed constituting the second target trajectory generated after the detection of the abnormality; and setting a position where at least information of the target position matches in the first and second sets as a switchover position of the basic target trajectory.

7. A non-transitory computer-readable medium storing a program, the program causing a computer to control a vehicle in which autonomous driving is performed, wherein the program is configured to cause a computer to execute:

generating a first target trajectory in the autonomous driving;

generating a second target trajectory in the autonomous driving;

generating a final target trajectory in the autonomous driving; and performing autonomous driving control of the vehicle based on the final target trajectory, wherein the first, second and final target trajectories are composed of a set of a target position and target speed of the vehicle, respectively, wherein, when a generating function of the first target trajectory included in a calculation unit that generates the first target trajectory is normal, the final target trajectory is generated using the first target trajectory, wherein, when an abnormality of the generating function is detected, failover processing is performed to switch the basic target trajectory used to generate the final target trajectory from the first target trajectory to the second target trajectory, wherein the failover processing includes:

estimating the movement amount of the vehicle during the failover processing based on the status information of the vehicle before the detection of the abnormality and final information of the first target trajectory generated before the detection of the abnormality;

calculating an updated target position and an updated target speed of the vehicle by updating the first target trajectory constituting the final information based on the estimated movement amount of the vehicle;

comparing a first set indicating a set of the updated target position and the updated target speed with a second set indicating a set of the target position and the target speed constituting the second target trajectory generated after the detection of the abnormality; and setting a position where at least information of the target position matches in the first and second sets as a switchover position of the basic target trajectory.

* * * * *